(12) United States Patent
Chang et al.

(10) Patent No.: US 9,570,939 B2
(45) Date of Patent: Feb. 14, 2017

(54) DOUBLE-PORT ENERGY STORAGE SYSTEM AND CONTROL METHOD THEREOF

(71) Applicant: Ablerex Electronics Co., Ltd., New Taipei (TW)

(72) Inventors: Yao-Jen Chang, Kaohsiung (TW); Chia-Hung Lee, Kaohsiung (TW)

(73) Assignee: Ablerex Electronics Co., Ltd., New Taipei (TW)

( * ) Notice: Subject to any disclaimer, the term of this patent is extended or adjusted under 35 U.S.C. 154(b) by 0 days.

(21) Appl. No.: 14/927,550

(22) Filed: Oct. 30, 2015

(65) Prior Publication Data

US 2016/0049829 A1  Feb. 18, 2016

Related U.S. Application Data

(63) Continuation-in-part of application No. 14/326,512, filed on Jul. 9, 2014.

(30) Foreign Application Priority Data

Nov. 19, 2014  (TW) .............................. 103140115 A

(51) Int. Cl.
*H02J 9/06* (2006.01)
*H02M 7/04* (2006.01)
*H02J 9/00* (2006.01)

(52) U.S. Cl.
CPC ................. *H02J 9/00* (2013.01); *H02J 9/062* (2013.01); *H02M 7/04* (2013.01); *Y10T 307/336* (2015.04)

(58) Field of Classification Search
CPC ......... H02J 9/062; H02J 9/00; Y10T 307/336; Y02B 10/72; H02M 7/04
See application file for complete search history.

(56) References Cited

U.S. PATENT DOCUMENTS

| 7,050,312 B2 * | 5/2006 | Tracy ...................... H02J 9/062 307/66 |
| 7,652,393 B2 * | 1/2010 | Moth ...................... H02J 9/062 307/64 |
| 7,911,187 B2 | 3/2011 | Lai et al. | |
| 9,293,945 B2 * | 3/2016 | Song ........................ H02J 4/00 |
| 2010/0327806 A1 | 12/2010 | Brisebois | |
| 2011/0296218 A1 | 12/2011 | Kim et al. | |

* cited by examiner

*Primary Examiner* — Jared Fureman
*Assistant Examiner* — Rafael Pacheco
(74) *Attorney, Agent, or Firm* — Alan D. Kamrath; Kamrath IP Lawfirm, P.A.

(57) ABSTRACT

A double-port energy storage system includes a bi-directional power conversion circuit, a DC-AC inverter circuit, an electric energy storage facility, a first switch, a second switch, a third switch, a fourth switch, a first AC port and a second AC port. The double-port energy storage system controllably provides various classifications of power supply quality by controllably switching on or off some of the first switch, the second switch, the third switch the fourth switch via the first AC port and the second AC port.

14 Claims, 6 Drawing Sheets

Prior-art

Prior-art

Prior-art

DOUBLE-PORT ENERGY STORAGE SYSTEM AND CONTROL METHOD THEREOF

This application is a continuation-in-part of U.S. patent application Ser. No. 14/326,512, filed Jul. 9, 2014, which is hereby incorporated by reference in its entirety.

BACKGROUND OF THE INVENTION

1. Field of the Invention

The present invention relates to a double-port energy storage system (ESS) and a control method thereof. More particularly, the present invention relates to the double-port energy storage system and the control method thereof for flexibly supplying various power qualities and simplifying the entire structure.

2. Description of the Related Art

FIG. 1 shows a schematic block diagram of a conventional energy storage system operated in a power storage state. Referring initially to FIG. 1, the conventional energy storage system 1 mainly includes a bidirectional power conversion circuit 11 and an electric energy storage facility 12. The bidirectional power conversion circuit 11 has an AC side and a DC side. The AC side of the bidirectional power conversion circuit 11 connects with a utility power source 10 via an AC switch 14 while the DC side of the bidirectional power conversion circuit 11 connects with the electric energy storage facility 12. The AC side of the bidirectional power conversion circuit 11 further connects with a load 13.

Still referring to FIG. 1, when the utility power source 10 stays within its normal tolerance and it is in an off-peak time period, for example, for an electric energy rate, the AC switch 14 is selectively switched on as a close state. Accordingly, an AC power supplied from the utility power source 10 is converted into a DC power by the bidirectional power conversion circuit 11 and the DC power is stored in the electric energy storage facility 12, as best shown in a lower dotted line and a directional arrow thereof in FIG. 1. The electric energy storage facility 12 comprises several batteries or DC power sources. The utility power source 10 does not further supply the AC power or any charging energy when the electric energy storage facility 12 is completely charged. In addition, the utility power source 10 will selectively supply the AC power into the load 13, as best shown in an upper dotted line and a directional arrow thereof in FIG. 1.

FIG. 2 shows a schematic block diagram of the conventional energy storage system, which corresponds to that in FIG. 1, operated in a power release state when the utility power stays within its normal tolerance. Referring to FIG. 2, when the utility power source 10 stays within its normal tolerance but it is in a peak time period, the AC switch 14 is selectively switched on as a close state. The utility power source 10 selectively supplies the AC power into the load 13, as best shown in an upper dotted line and a directional arrow thereof in FIG. 2. In addition, the electric energy storage facility 12 of the conventional energy storage system is changed into the power release state and a DC power of the electric energy storage facility 12 is converted into an AC power supplying to the load 13 via the bidirectional power conversion circuit 11, as best shown in a lower dotted line and a directional arrow thereof in FIG. 2. Accordingly, the electric energy storage facility 12, which stores electric energy during the off-peak time period, accomplishes supplying the power to the load 13 as a part of power consumption at the load 13.

FIG. 3 shows a schematic block diagram of the conventional energy storage system operated in another power release state, which corresponds to that in FIG. 2. Referring to FIG. 3, when the utility power source 10 is out of tolerance or failure, the AC switch 14 is selectively switched off as an open state to disconnect with the utility power source 10. The electric energy storage facility 12 of the conventional energy storage system is still operated in the power release state and the DC power of the electric energy storage facility 12 is still converted into the AC power supplying to the load 13 via the bidirectional power conversion circuit 11, as best shown in a dotted line and a directional arrow thereof in FIG. 3. Accordingly, the electric energy storage facility 12 supplies entire power requirement to the load 13.

For example, U.S. Pat. No. 7,911,187 entitled "Energy storage system", discloses an energy storage system including a battery charger and energy storage devices. The battery charger is connected to a DC/AC current source. The energy storage devices are coupled between the battery charger and subsystems respectively. Each of the energy storage devices includes a magnetic capacitor (MCAP) and an over current protection device (OCPD). MCAPs are charged by the battery charger and supply the electric power to subsystems connected the energy storage devices. OCPDs detect current from MCAPs to subsystems and protect subsystems from excessive currents of voltages.

Another U.S. Patent Application Publication No. 20100327806 entitled "Monitoring cells in energy storage system", discloses a system for monitoring an energy storage system composed of multiple cells connected in series has a chain of monitors including at least first and second monitors. The first monitor is configured for monitoring at least a first cell in the energy storage system to produce first monitored data. The second monitor is configured for monitoring at least a second cell in the energy storage system to produce second monitored data. The first monitor is further configured for transferring the first monitored data to the second monitor for delivery to a controller.

Another U.S. Patent Application Publication No. 20110296218 entitled "Battery management system, method of controlling the same, and energy storage system including the battery management system", discloses a battery management system (BMS), a method of controlling the same, and an energy storage system including the battery management system. The BMS may reduce costs by stably supplying power to an insulating unit in a power-saving mode even when an isolator has no built-in direct current (DC)-DC converter.

However, the conventional energy storage system only provides a single AC port and a single function thereof but it fails to provide double AC ports and functions thereof. Disadvantageously, the functions and operations of the conventional energy storage system are however limited and inflexible. The above-mentioned patents and publications are incorporated herein by reference for purposes including, but not limited to, indicating the background of the present invention and illustrating the situation of the art.

As is described in greater detail below, the present invention intends to provide a double-port energy storage system and a control method thereof. A first AC port, a second AC port and a plurality of switches are arranged in the energy storage system on which to form double AC ports for supplying the stored power by controllably operating the switches. A first power quality (e.g. voltage or frequency) supplied at the first AC port depends on that of a utility power source and a second power quality supplied at the second AC port is independent from the utility power source such that the double-port energy storage system is capable of supplying various levels (or classifications) of power quality via the first AC port and the second AC port. Advantageously, the double-port energy storage system of the present invention is successful in flexibly supplying various levels (or classifications) of power quality. In addition, the double-port energy storage system of the present invention provided with two AC ports supplies various levels of power quality without installing two conventional single-port energy storage systems. Advantageously, the present invention successfully simplifies the entire structure of double-port energy storage systems.

SUMMARY OF THE INVENTION

The primary objective of this invention is to provide a double-port energy storage system and a control method thereof. A first AC port and a second AC port are arranged in the energy storage system to form a double AC port structure, and a bidirectional power conversion circuit and a DC-AC inverter circuit are applied to supply a power stored in an electric energy storage facility via the first AC port and the second AC port. The first AC port supplies a first power quality depending on that of a utility power source while the second AC port supplies a second power quality which is clean and stable or different from voltages, frequencies or waveforms of a utility power source. Advantageously, the double-port energy storage system of the present invention is successful in flexibly supplying various levels (or classifications) of power quality and simplifying the entire structure of the system.

The double-port energy storage system in accordance with an aspect of the present invention includes:

a bidirectional power conversion circuit including an AC side and a DC side;

a DC-AC inverter circuit including a DC side and an AC side;

an electric energy storage facility connecting between the DC side of the bidirectional power conversion circuit and the DC side of the DC-AC inverter circuit;

a first AC port connecting with the AC side of the DC-AC inverter circuit;

a second AC port connecting between a utility power source or an AC power source and the AC side of the bidirectional power conversion circuit;

a first switch connecting between the utility power source or the AC power source and the AC side of the bidirectional power conversion circuit;

a second switch connecting between a first connection point, which is formed between the first switch and the AC side of the bidirectional power conversion circuit, and the first AC port;

a third switch connecting between the utility power source or the AC power source and the second AC port; and a fourth switch connecting between a second connection point, which is formed between the second switch and the first AC port, and the second AC port;

wherein when the utility power source or the AC power source stays within a normal tolerance, the first switch and the third switch are selectively switched on as a close state and the second switch and the fourth switch are selectively switched off as an open state allowing the utility power source or the AC power source to directly supply an AC power to the second AC port and further to directly supply the AC power to the AC side of the bidirectional power conversion circuit, such that the bidirectional power conversion circuit converts the AC power of the utility power source or the AC power source into a DC power to charge the electric energy storage facility, and the DC power is further converted into a stable AC power by the DC-AC inverter circuit to supply to the first AC port;

or, when the utility power source or the AC power source stays within the normal tolerance and the electric energy storage facility discharges, the first switch and the third switch are selectively switched on as a close state and the second switch and the fourth switch are selectively switched off as an open state allowing the utility power source or the AC power source to directly supply the AC power to the second AC port, the DC-AC inverter circuit to convert the DC power stored in the electric energy storage facility into the stable AC power to supply to the first AC port, further the bidirectional power conversion circuit to selectively convert the DC power stored in the electric energy storage facility into the AC power to supply to the utility power source or the AC power source;

or, when the utility power source or the AC power source is out of tolerance, failure or under maintenance, the first switch and the third switch are selectively switched off as an open state and the second switch and the fourth switch are selectively switched on as a close state allowing the bidirectional power conversion circuit and the DC-AC inverter circuit to convert the DC power stored in the electric energy storage facility into the AC power to supply to the first AC port and the second AC port in parallel.

In a separate aspect of the present invention, the bidirectional power conversion circuit is formed from a combination circuit or a device having a function of bidirectional power conversion.

In a further separate aspect of the present invention, the DC-AC inverter circuit is formed from a combination circuit or a device having a function of DC-AC inversion.

In yet a further separate aspect of the present invention, the first AC port connects with a first load.

In yet a further separate aspect of the present invention, the second AC port connects with a second load.

In yet a further separate aspect of the present invention, when the utility power source or the AC power source is out of tolerance or failure, the first switch and the third switch are switched off as an open state and the second switch and the fourth switch are switched on as a close state, thereby avoiding interference of instability or failure of the utility power source or the AC power source on a power quality of the AC power supplied from the first AC port, the second AC port or both.

In yet a further separate aspect of the present invention, when the bidirectional power conversion circuit or the DC-AC inverter circuit is under maintenance or failure, the first switch and the second switch are selectively switched on as a close state allowing the utility power source or the AC power source to directly supply the AC power to the first AC port and further allowing the utility power source or the AC power source to directly supply the AC power to the second AC port by switching on the third switch.

The control method for a double-port energy storage system in accordance with an aspect of the present invention includes:

connecting an energy storage system to a utility power source or an AC power source, with the energy storage system including a bidirectional power conversion circuit, a DC-AC inverter circuit, an electric energy storage facility, a first AC port, a second AC port, a first switch, a second switch, a third switch and a fourth switch;

providing the bidirectional power conversion circuit including an AC side and a DC side, with the DC-AC inverter circuit including a DC side and an AC side, with the electric energy storage facility connecting between the DC side of the bidirectional power conversion circuit and the DC side of the DC-AC inverter circuit, with the first AC port connecting with the AC side of the DC-AC inverter circuit, with the second AC port connecting between the utility power source or the AC power source and the AC side of the bidirectional power conversion circuit, with the first switch connecting between the utility power source or the AC power source and the AC side of the bidirectional power conversion circuit, with the second switch connecting between a first connection point, which is formed between the first switch and the AC side of the bidirectional power conversion circuit, and the first AC port, with the third switch connecting between the utility power source or the AC power source and the second AC port, with the fourth switch connecting between a second connection point, which is formed between the second switch and the first AC port, and the second AC port;

when the utility power source or the AC power source stays within a normal tolerance, the first switch and the third switch are selectively switched on as a close state and the second switch and the fourth switch are selectively switched off as an open state allowing the utility power source or the AC power source to directly supply an AC power to the second AC port and further to directly supply the AC power to the AC side of the bidirectional power conversion circuit, such that the bidirectional power conversion circuit converts the AC power of the utility power source or the AC power source into a DC power to charge the electric energy storage facility, and the DC power is further converted into a stable AC power by the DC-AC inverter circuit to supply to the first AC port;

or, when the utility power source or the AC power source stays within the normal tolerance and the electric energy storage facility discharges, the first switch and the third switch are selectively switched on as a close state and the second switch and the fourth switch are selectively switched off as an open state allowing the utility power source or the AC power source to directly supply the AC power to the second AC port, the DC-AC inverter circuit to convert the DC power stored in the electric energy storage facility into the stable AC power to supply to the first AC port, further the bidirectional power conversion circuit to selectively convert the DC power stored in the electric energy storage facility into the AC power to supply to the utility power source or the AC power source;

or, when the utility power source or the AC power source is out of tolerance, failure or under maintenance, the first switch and the third switch are selectively switched off as an open state and the second switch and the fourth switch are selectively switched on as a close state allowing the bidirectional power conversion circuit and the DC-AC inverter circuit to convert the DC power stored in the electric energy storage facility into the AC power to supply to the first AC port and the second AC port in parallel.

In a separate aspect of the present invention, the bidirectional power conversion circuit is formed from a combination circuit or a device having a function of bidirectional power conversion.

In a further separate aspect of the present invention, the DC-AC inverter circuit is formed from a combination circuit or a device having a function of DC-AC inversion.

In yet a further separate aspect of the present invention, the first AC port connects with a first load.

In yet a further separate aspect of the present invention, the second AC port connects with a second load.

In yet a further separate aspect of the present invention, when the utility power source or the AC power source is out of tolerance or failure, the first switch and the third switch are switched off as an open state and the second switch and the fourth switch are switched on as a close state, thereby avoiding interference of instability or failure of the utility power source or the AC power source on a power quality of the AC power supplied from the first AC port, the second AC port or both.

In yet a further separate aspect of the present invention, when the bidirectional power conversion circuit or the DC-AC inverter circuit is under maintenance or failure, the first switch and the second switch are selectively switched on as a close state allowing the utility power source or the AC power source to directly supply the AC power to the first AC port and further allowing the utility power source or the AC power source to directly supply the AC power to the second AC port by switching on the third switch.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a double-port energy storage system and a control method thereof in accordance with the preferred embodiment of the present invention can be applicable to various energy storage systems (ESS) having two ports, three ports or multiple ports. By way of example, the energy storage system includes a residential ESS, a community ESS and a commercial ESS which is not limitative of the present invention.

Figure 1:
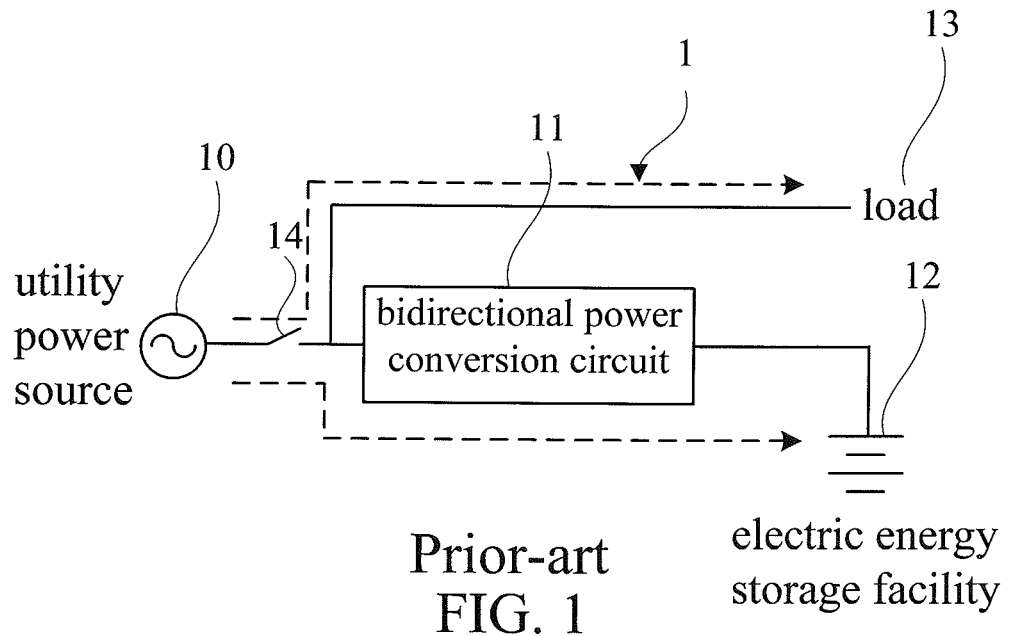
FIG. 1 is a schematic block diagram of a conventional energy storage system operated in a power storage state.
Figure 2:
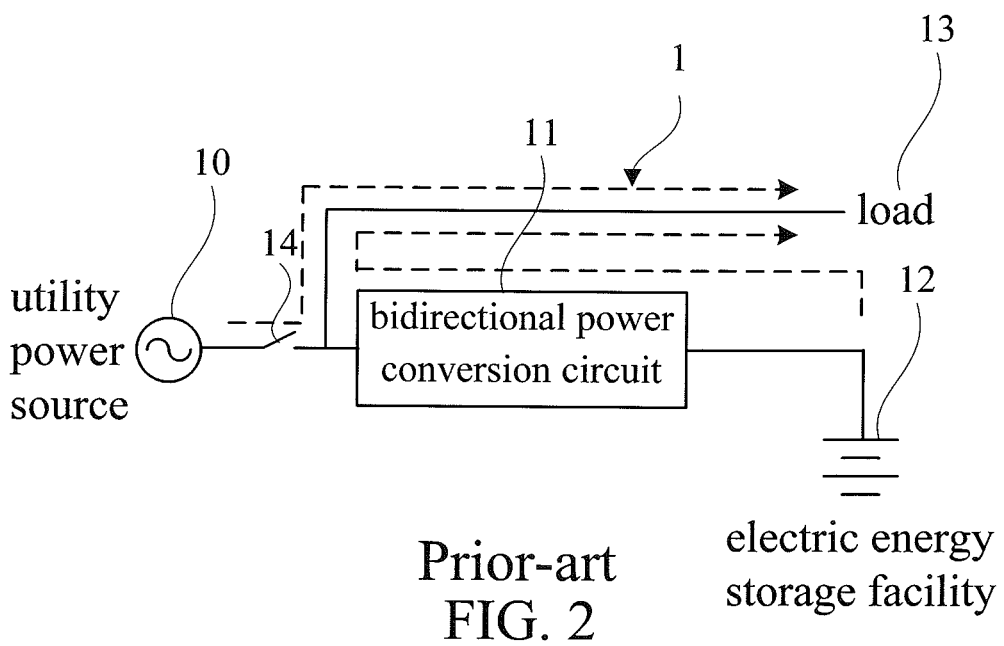
FIG. 2 is a schematic block diagram of the conventional energy storage system operated in a power release state when the utility power stays within its normal tolerance.
Figure 3:
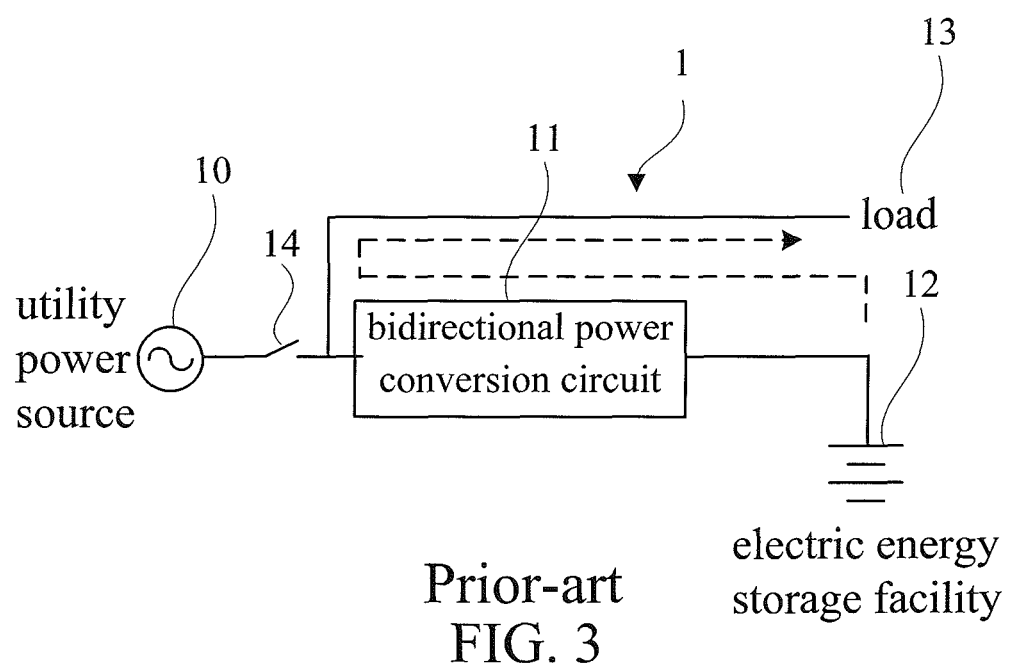
FIG. 3 is a schematic block diagram of the conventional energy storage system operated in another power release state when the utility power is out of tolerance or failure.
Figure 4:
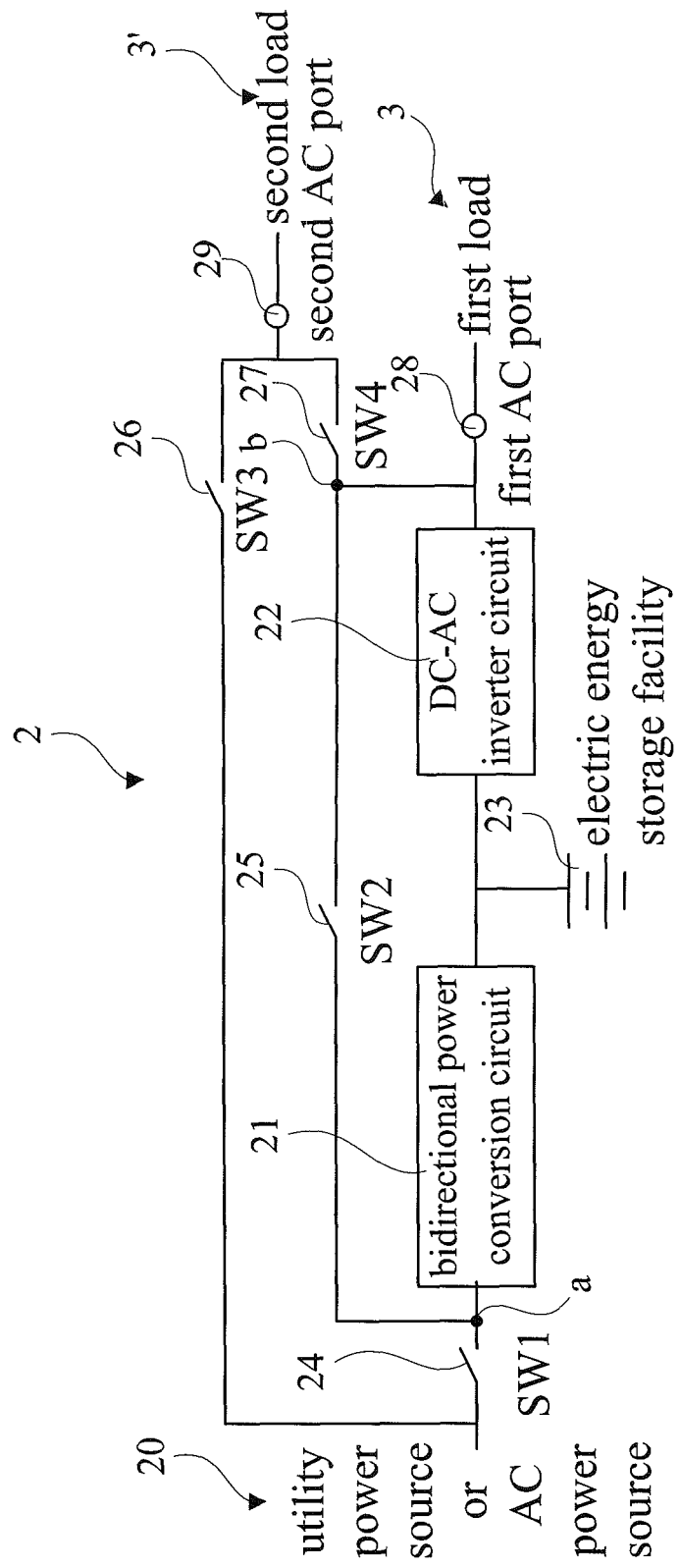
FIG. 4 is a schematic block diagram of a double-port energy storage system in accordance with a preferred embodiment of the present invention.

FIG. 4 shows a schematic block diagram of a double-port energy storage system in accordance with a preferred embodiment of the present invention. Referring now to FIG. 4, the double-port energy storage system 2 of the preferred embodiment connects with a utility power source 20 (or AC power source) so as to store the power supplied from the utility power source 20 in the double-port energy storage system 2, or alternatively to supply the power stored in the double-port energy storage system 2 to the utility power source 20. In the preferred embodiment, the AC power source is selected from various renewable energy sources, for example, including solar power, wind power, fuel cells or other renewable energies. Still referring to FIG. 4, the double-port energy storage system 2 includes a bidirectional power conversion circuit 21, a DC-AC inverter circuit (or DC-AC inverter) 22, an electric energy storage facility 23, a first switch 24, a second switch 25, a third switch 26, a fourth switch 27, a first AC port 28 and a second AC port 29. In power storage or release operation, the bidirectional power conversion circuit 21, the DC-AC inverter circuit 22 and the electric energy storage facility 23 are controllably operated by selectively switching on or off some of the first switch 24, the second switch 25, the third switch 26 and the fourth switch 27. Accordingly, the first AC port 28 and the second AC port 29 can supply the power stored in the electric energy storage facility 23 separately or in parallel such that the double-port energy storage system 2 can supply various levels (or classifications) of power quality. A source of the electric energy storage facility 23 is selected from various renewable energy sources, for example, including solar power, wind power, fuel cells or other renewable energies (the likes).

With continued reference to FIG. 4, the bidirectional power conversion circuit 21 has an AC side (left side) and a DC side (right side). The DC-AC inverter circuit 22 has a DC side (left side) and an AC side (right side). The electric energy storage facility 23 connects between the DC side of the bidirectional power conversion circuit 21 and the DC side of the DC-AC inverter circuit 22. The bidirectional power conversion circuit 21 is selectively formed from a combination circuit or a device having a function of bidirectional power conversion and the DC-AC inverter circuit 22 is selectively formed from a combination circuit or a device having a function of DC-AC inversion. The first AC port 28 and the second AC port 29 are suitably provided on the double-port energy storage system 2. The double-port energy storage system 2 further connects with a first load 3 and a second load 3' via the first AC port 28 and the second AC port 29, respectively.

Still referring to FIG. 4, the first switch 24 connects between the utility power source 20 (or AC power source) and the AC side of the bidirectional power conversion circuit 21. In a preferred embodiment, the first switch 24 is an AC switch and is selected from various mechanical devices including a relay and a magnetic contactor or various solid-state devices including a set of anti-parallel thyristors or insulated gate bipolar transistors (IGBTs).

Still referring to FIG. 4, the second switch 25, the third switch 26 and the fourth switch 27 are an AC switch and are selected from various mechanical devices including a relay and a magnetic contactor or various solid-state devices including a set of anti-parallel thyristors or insulated gate bipolar transistors (IGBTs). The second switch 25 connects between a first connection point (identified as "a"), which is formed between the first switch 24 and the AC side of the bidirectional power conversion circuit 21, and the first AC port 28. The third switch 26 connects between the utility power source 20 (or AC power source) and the second AC port 29. The fourth switch connects between a second connection point (identified as "b"), which is formed between the second switch 25 and the first AC port 28, and the second AC port 29.

Figure 5:
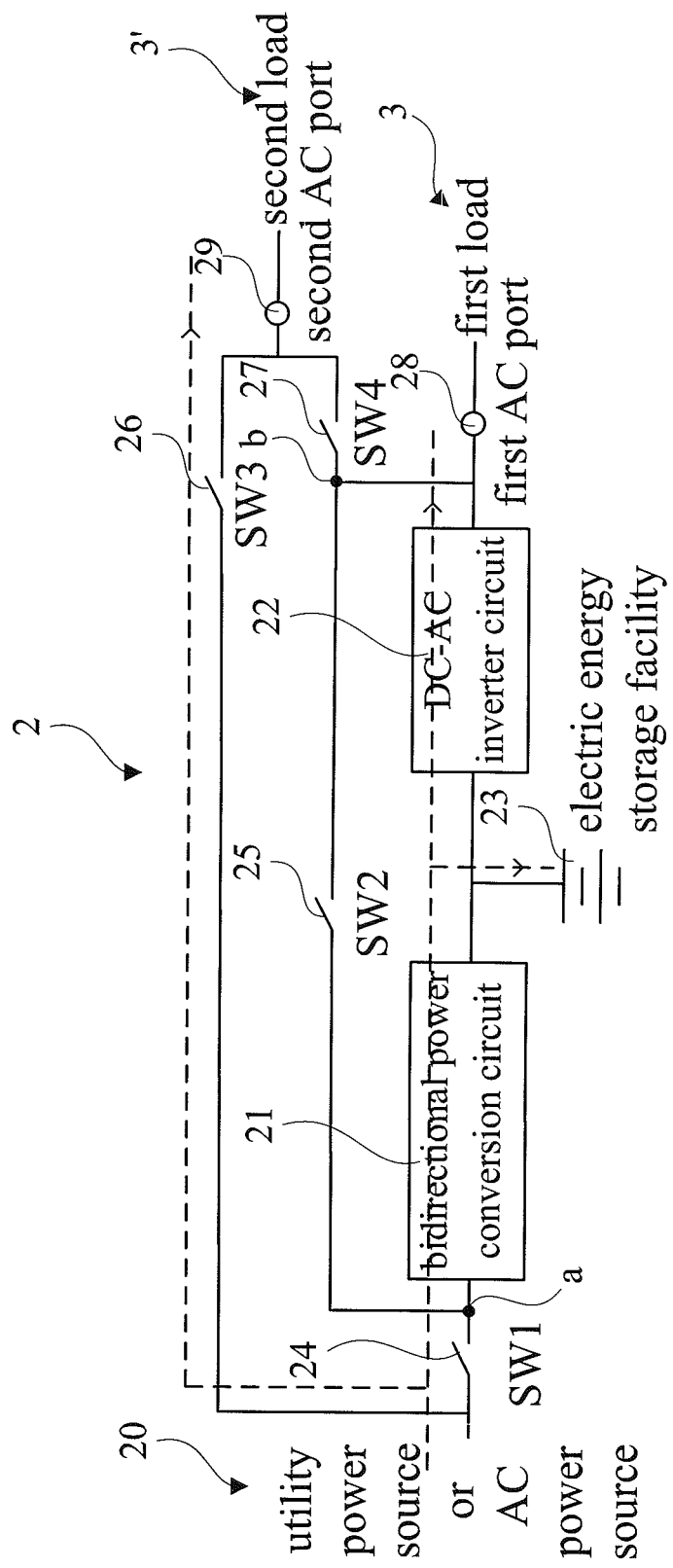
FIG. 5 is a schematic block diagram of the double-port energy storage system and the control method thereof in accordance with the preferred embodiment of the present invention operated in a power storage state when the utility power stays within its normal tolerance.

FIG. 5 shows a schematic block diagram of the double-port energy storage system, as shown in FIG. 4, and the control method thereof in accordance with the preferred embodiment of the present invention operated in a power storage state when the utility power stays within its normal tolerance. Referring to FIG. 5, the control method of the double-port energy storage system 2 includes a first operational state: when the utility power source 20 (or AC power source) stays within its normal tolerance, the first switch 24 and the third switch 26 are selectively switched on as a close state and the second switch 25 and the fourth switch 27 are selectively switched off as an open state allowing the utility power source 20 (or AC power source) to directly supply an AC power to the second AC port 29 (second load 3'), as best shown in upper dotted line and arrow of FIG. 5. Furthermore, the AC power of the utility power source 20 (or AC power source) directly supplies to the AC side of the bidirectional power conversion circuit 21 which converts the AC power of the utility power source 20 (or AC power source) into a DC power to charge the electric energy storage facility 23, and the DC-AC inverter circuit 22 is further operated to convert the DC power into a stable AC power to supply to the first AC port 28 (first load 3), as best shown in lower dotted line and arrow of FIG. 5. Accordingly, when the utility power source 20 (or AC power source) stays within its normal tolerance, the power quality supplied to the second load 3' depends upon the utility power source 20 (or AC power source). Additionally, the power quality supplied to the first load 3 is independent upon the utility power source 20 (or AC power source) but depending upon the operation of the DC-AC inverter circuit 22 to avoid interference from the utility power source 20 (or AC power source), namely, the clean and stable power quality whose voltages, frequencies or waveforms are different from those of the utility level of power quality. Consequently, the load can selectively connect with the first AC port 28 or the second AC port 29 according to the need of power quality.

Figure 6:
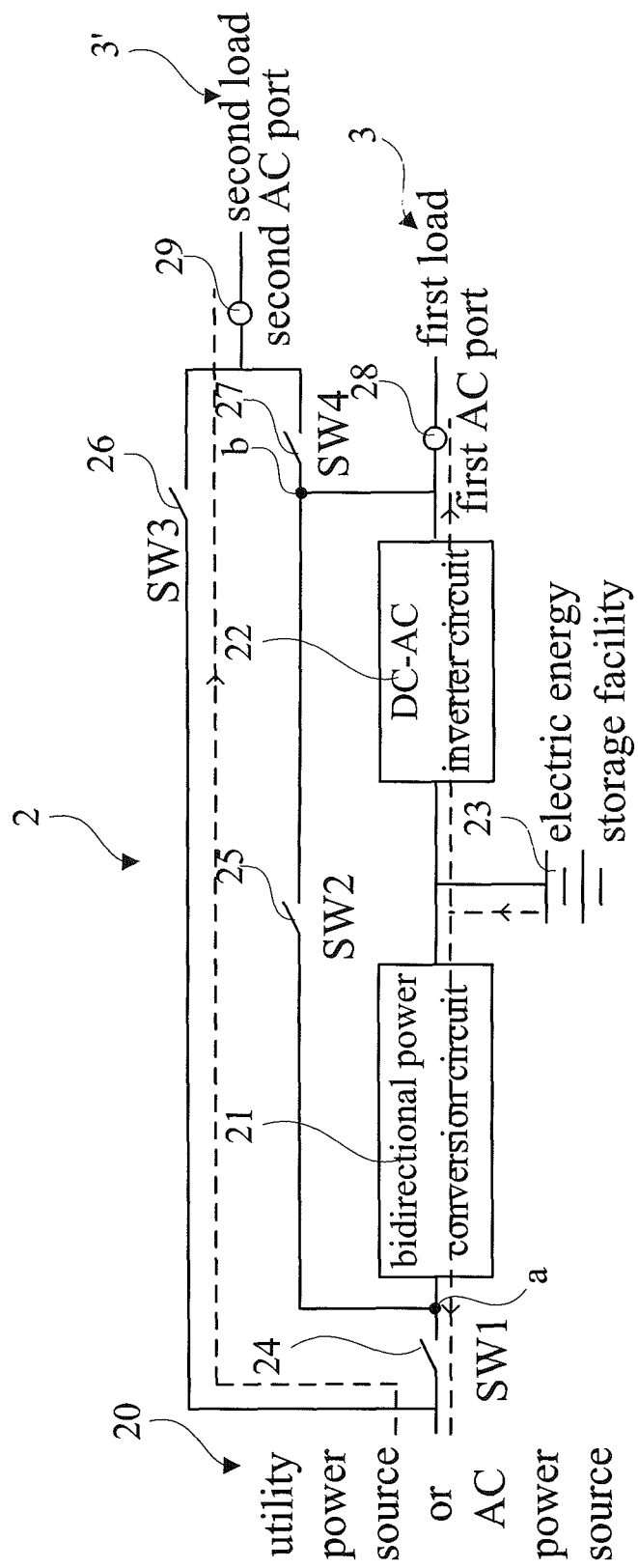
FIG. 6 is a schematic block diagram of the double-port energy storage system and the control method thereof in accordance with the preferred embodiment of the present invention operated in a power release state when the utility power stays within its normal tolerance.

FIG. 6 shows a schematic block diagram of the double-port energy storage system and the control method thereof in accordance with the preferred embodiment of the present invention operated in a power release state when the utility power stays within its normal tolerance, comparing with those shown in FIG. 5. Referring to FIG. 6, the control method of the double-port energy storage system 2 includes a second operational state: when the utility power source 20 (or AC power source) stays within its normal tolerance and the electric energy storage facility 23 discharges, the first switch 24 and the third switch 26 are selectively switched on as a close state and the second switch 25 and the fourth switch 27 are selectively switched off as an open state allowing the utility power source 20 (or AC power source) to directly supply an AC power to the second AC port 29 (second load 3'), as best shown in upper dotted line and arrow of FIG. 6. Furthermore, the DC-AC inverter circuit 22 is operated to convert the DC power stored in the electric energy storage facility 23 into the stable AC power to supply to the first AC port 28 (first load 3), as best shown in lower, right dotted line and arrow of FIG. 6. Meanwhile, the bidirectional power conversion circuit 21 is selectively operated to convert the DC power stored in the electric energy storage facility 23 into the AC power to reversely supply to the utility power source 20 (or AC power source), as best shown in lower, left dotted line and arrow of FIG. 6.

Figure 7:
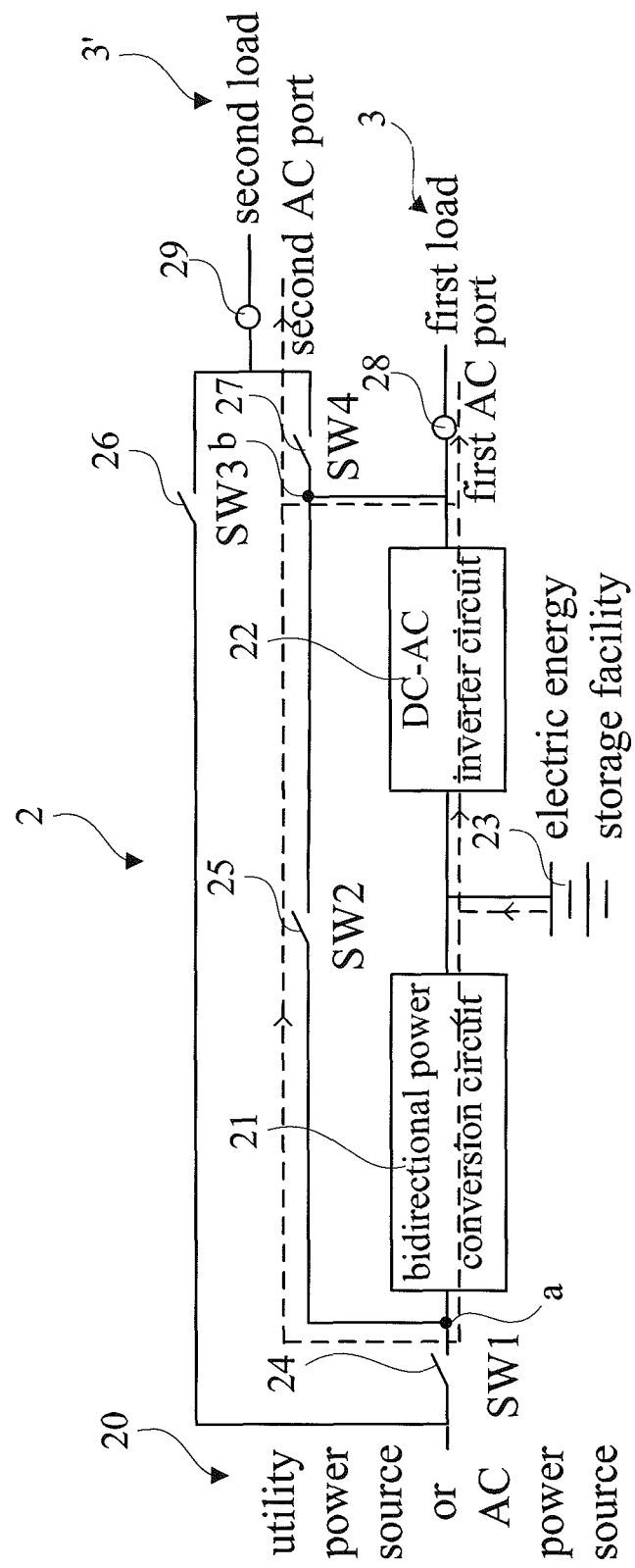
FIG. 7 is a schematic block diagram of the double-port energy storage system and the control method thereof in accordance with the preferred embodiment of the present invention operated in another power release state when the utility power is out of tolerance or failure.

FIG. 7 is a schematic block diagram of the double-port energy storage system and the control method thereof in accordance with the preferred embodiment of the present invention operated in another power release state when the utility power is out of tolerance or failure, comparing with those shown in FIGS. 5 and 6. Referring to FIG. 7, the control method of the double-port energy storage system 2 includes a third operational state: when the utility power source 20 (or AC power source) stays within its normal tolerance and the electric energy storage facility 23 discharges, the first switch 24 and the third switch 26 are selectively switched off as an open state and the second switch 25 and the fourth switch 27 are selectively switched on as a close state for interrupting the power supply from the utility power source 20 (or AC power source) to the first AC port 28 and the second AC port 29. Furthermore, the DC-AC inverter circuit 22 is operated to convert the DC power stored in the electric energy storage facility 23 into the stable AC power to supply to the first AC port 28 (first load 3), as best shown in lower, right dotted line and arrow of FIG. 7. Meanwhile, the bidirectional power conversion circuit 21 is further operated to convert the DC power stored in the electric energy storage facility 23 into the AC power to supply to the second AC port 29 (second load 3') in parallel, as best shown in lower, left dotted line, upper dotted line and arrow of FIG. 7.

With continued reference to FIG. 7, the control method of the double-port energy storage system 2 includes a fourth operational state: when the utility power source 20 (or AC power source) is out of tolerance or fails, the first switch 24 and the third switch 26 are selectively switched off as an open state and the second switch 25 and the fourth switch 27 are selectively switched on as a close state to avoid conditions of power quality or failure of the utility power source 20 (or AC power source) interfering the first AC port 28 and the second AC port 29. Furthermore, the DC-AC inverter circuit 22 is operated to convert the DC power stored in the electric energy storage facility 23 into the stable AC power to supply to the first AC port 28 (first load 3), as best shown in lower, right dotted line and arrow of FIG. 7. Meanwhile, the bidirectional power conversion circuit 21 is further operated to convert the DC power stored in the electric energy storage facility 23 into the AC power to supply to the second AC port 29 (second load 3') in parallel, as best shown in lower, left dotted line, upper dotted line and arrow of FIG. 7.

Referring back to FIG. 5, the control method of the double-port energy storage system 2 includes a fifth operational state: when the utility power source 20 (or AC power source) stays within its normal tolerance and the bidirectional power conversion circuit 21 or the DC-AC inverter circuit 22 is under maintenance, the first switch 24 and the second switch 25 are selectively switched on as a close state allowing the utility power source 20 (or AC power source) to directly supply the AC power to the first AC port 28 (first load 3). Meanwhile, the utility power source 20 (or AC power source) can directly supply the AC power to the second AC port 29 (second load 3') by switching on the third switch 26, as best shown in upper dotted line and arrow of FIG. 5.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A double-port energy storage system comprising:
a bidirectional power conversion circuit including an AC side and a DC side;
a DC-AC inverter circuit including a DC side and an AC side;
an electric energy storage facility connecting between the DC side of the bidirectional power conversion circuit and the DC side of the DC-AC inverter circuit;
a first AC port connecting with the AC side of the DC-AC inverter circuit;
a second AC port connecting between a utility power source or an AC power source and the AC side of the bidirectional power conversion circuit;
a first switch connecting between the utility power source or the AC power source and the AC side of the bidirectional power conversion circuit;
a second switch connecting between a first connection point, which is formed between the first switch and the AC side of the bidirectional power conversion circuit, and the first AC port;
a third switch connecting between the utility power source or the AC power source and the second AC port; and
a fourth switch connecting between a second connection point, which is formed between the second switch and the first AC port, and the second AC port;
wherein when the utility power source or the AC power source stays within a normal tolerance, the first switch and the third switch are selectively switched on as a close state and the second switch and the fourth switch are selectively switched off as an open state allowing the utility power source or the AC power source to directly supply an AC power to the second AC port and further to directly supply the AC power to the AC side of the bidirectional power conversion circuit, such that the bidirectional power conversion circuit converts the AC power of the utility power source or the AC power source into a DC power to charge the electric energy storage facility, and the DC power is further converted into a stable AC power by the DC-AC inverter circuit to supply to the first AC port;
or, when the utility power source or the AC power source stays within the normal tolerance and the electric energy storage facility discharges, the first switch and the third switch are selectively switched on as a close state and the second switch and the fourth switch are selectively switched off as an open state allowing the utility power source or the AC power source to directly supply the AC power to the second AC port, the DC-AC inverter circuit to convert the DC power stored in the electric energy storage facility into the stable AC power to supply to the first AC port, further the bidirectional power conversion circuit to selectively convert the DC power stored in the electric energy storage facility into the AC power to supply to the utility power source or the AC power source;
or, when the utility power source or the AC power source is out of tolerance, failure or under maintenance, the first switch and the third switch are selectively switched off as an open state and the second switch and the fourth switch are selectively switched on as a close state allowing the bidirectional power conversion circuit and the DC-AC inverter circuit to convert the DC power stored in the electric energy storage facility into the AC power to supply to the first AC port and the second AC port in parallel.

2. The double-port energy storage system as defined in claim 1, wherein the bidirectional power conversion circuit is formed from a combination circuit or a device having a function of bidirectional power conversion.

3. The double-port energy storage system as defined in claim 1, wherein the DC-AC inverter circuit is formed from a combination circuit or a device having a function of DC-AC inversion.

4. The double-port energy storage system as defined in claim 1, wherein the first AC port connects with a first load.

5. The double-port energy storage system as defined in claim 1, wherein the second AC port connects with a second load.

6. The double-port energy storage system as defined in claim 1, wherein when the utility power source or the AC power source is out of tolerance or failure, the first switch and the third switch are switched off as an open state and the second switch and the fourth switch are switched on as a close state, thereby avoiding interference of instability or failure of the utility power source or the AC power source on a power quality of the AC power supplied from the first AC port, the second AC port or both.

7. The double-port energy storage system as defined in claim 1, wherein when the bidirectional power conversion circuit or the DC-AC inverter circuit is under maintenance or failure, the first switch and the second switch are selectively switched on as a close state allowing the utility power source or the AC power source to directly supply the AC power to the first AC port and further allowing the utility power source or the AC power source to directly supply the AC power to the second AC port by switching on the third switch.

8. A control method for a double-port energy storage system comprising:
   connecting an energy storage system to a utility power source or an AC power source, with the energy storage system including a bidirectional power conversion circuit, a DC-AC inverter circuit, an electric energy storage facility, a first AC port, a second AC port, a first switch, a second switch, a third switch and a fourth switch;
   providing the bidirectional power conversion circuit including an AC side and a DC side, with the DC-AC inverter circuit including a DC side and an AC side, with the electric energy storage facility connecting between the DC side of the bidirectional power conversion circuit and the DC side of the DC-AC inverter circuit, with the first AC port connecting with the AC side of the DC-AC inverter circuit, with the second AC port connecting between the utility power source or the AC power source and the AC side of the bidirectional power conversion circuit, with the first switch connecting between the utility power source or the AC power source and the AC side of the bidirectional power conversion circuit, with the second switch connecting between a first connection point, which is formed between the first switch and the AC side of the bidirectional power conversion circuit, and the first AC port, with the third switch connecting between the utility power source or the AC power source and the second AC port, with the fourth switch connecting between a second connection point, which is formed between the second switch and the first AC port, and the second AC port;
   when the utility power source or the AC power source stays within a normal tolerance, the first switch and the third switch are selectively switched on as a close state and the second switch and the fourth switch are selectively switched off as an open state allowing the utility power source or the AC power source to directly supply an AC power to the second AC port and further to directly supply the AC power to the AC side of the bidirectional power conversion circuit, such that the bidirectional power conversion circuit converts the AC power of the utility power source or the AC power source into a DC power to charge the electric energy storage facility, and the DC power is further converted into a stable AC power by the DC-AC inverter circuit to supply to the first AC port;
   or, when the utility power source or the AC power source stays within the normal tolerance and the electric energy storage facility discharges, the first switch and the third switch are selectively switched on as a close state and the second switch and the fourth switch are selectively switched off as an open state allowing the utility power source or the AC power source to directly supply the AC power to the second AC port, the DC-AC inverter circuit to convert the DC power stored in the electric energy storage facility into the stable AC power to supply to the first AC port, further the bidirectional power conversion circuit to selectively convert the DC power stored in the electric energy storage facility into the AC power to supply to the utility power source or the AC power source;
   or, when the utility power source or the AC power source is out of tolerance, failure or under maintenance, the first switch and the third switch are selectively switched off as an open state and the second switch and the fourth switch are selectively switched on as a close state allowing the bidirectional power conversion circuit and the DC-AC inverter circuit to convert the DC power stored in the electric energy storage facility into the AC power to supply to the first AC port and the second AC port in parallel.

9. The control method for the double-port energy storage system as defined in claim 8, wherein the bidirectional power conversion circuit is formed from a combination circuit or a device having a function of bidirectional power conversion.

10. The control method for the double-port energy storage system as defined in claim 8, wherein the DC-AC inverter circuit is formed from a combination circuit or a device having a function of DC-AC inversion.

11. The control method for the double-port energy storage system as defined in claim 8, wherein the first AC port connects with a first load.

12. The control method for the double-port energy storage system as defined in claim 8, wherein the second AC port connects with a second load.

13. The control method for the double-port energy storage system as defined in claim 8, wherein when the utility power source or the AC power source is out of tolerance or failure, the first switch and the third switch are switched off as an open state and the second switch and the fourth switch are switched on as a close state, thereby avoiding interference of instability or failure of the utility power source or the AC power source on a power quality of the AC power supplied from the first AC port, the second AC port or both.

14. The control method for the double-port energy storage system as defined in claim 8, wherein when the bidirectional power conversion circuit or the DC-AC inverter circuit is under maintenance or failure, the first switch and the second switch are selectively switched on as a close state allowing the utility power source or the AC power source to directly supply the AC power to the first AC port and further allowing the utility power source or the AC power source to directly supply the AC power to the second AC port by switching on the third switch.

\* \* \* \* \*